US010721912B2

(12) United States Patent
Hanson (10) Patent No.: US 10,721,912 B2
(45) Date of Patent: Jul. 28, 2020

(54) METHODS AND DEVICE FOR PET ENRICHMENT (71) Applicant: Kevin Hanson, Boise, ID (US)

(72) Inventor: Kevin Hanson, Boise, ID (US)

(*) Notice: Subject to any disclaimer, the term of this patent is extended or adjusted under 35 U.S.C. 154(b) by 327 days.

(21) Appl. No.: 15/143,507

(22) Filed: Apr. 30, 2016

(65) Prior Publication Data
US 2016/0316716 A1 Nov. 3, 2016

Related U.S. Application Data (60) Provisional application No. 62/155,439, filed on Apr. 30, 2015.

(51) Int. Cl.
A01K 5/02 (2006.01)
A01K 15/02 (2006.01)
G06K 9/00 (2006.01)

(52) U.S. Cl.
CPC ............. A01K 5/02 (2013.01); A01K 15/02 (2013.01); G06K 9/00342 (2013.01)

(58) Field of Classification Search
CPC ......... A01K 15/02; A01K 15/021; A01K 5/02
See application file for complete search history.

(56) References Cited

U.S. PATENT DOCUMENTS

| 6,273,027 | B1 | 8/2001 | Watson | |
|---|---|---|---|---|
| 6,651,592 | B2 | 11/2003 | Maddox | |
| 7,974,443 | B2 | 7/2011 | Kipman | |
| 8,462,207 | B2 | 6/2013 | Garcia | |
| 8,493,496 | B2 | 7/2013 | Freedman | |
| 8,707,900 | B1* | 4/2014 | Womble | A01K 5/0114 119/51.11 |
| 8,908,277 | B2 | 12/2014 | Pesach | |
| 8,933,876 | B2 | 1/2015 | Galor | |
| 9,723,813 | B2* | 8/2017 | Davis | A01K 5/02 |
| 2005/0068183 | A1* | 3/2005 | Yuasa | A01K 29/00 340/573.1 |
| 2005/0284412 | A1* | 12/2005 | Kroll | A01K 15/021 119/719 |
| 2010/0019586 | A1 | 1/2010 | Lu | |
| 2010/0199228 | A1 | 8/2010 | Latta | |
| 2011/0018994 | A1* | 1/2011 | Russoniello | A01K 15/025 348/143 |
| 2011/0139076 | A1* | 6/2011 | Pu | A01K 5/0114 119/51.02 |
| 2012/0312247 | A1* | 12/2012 | Ebersole | A01K 15/02 119/712 |
| 2014/0083364 | A1* | 3/2014 | Anderson | A01K 5/01 119/51.01 |

(Continued)

FOREIGN PATENT DOCUMENTS

WO    WO-2006093875 A2 *  9/2006  .......... A01K 15/021

Primary Examiner — Magdalena Topolski
(74) Attorney, Agent, or Firm — Hettie L. Haines (57) ABSTRACT The pet enrichment device comprises a housing, a microcontroller, a treat dispenser, an interface device, and a detection device. The pet enrichment device provides automated training by displaying videos and/or projecting audio via the interface device. The detection device captures, analyzes, and tracks the specific movement and specific positions of the animal. If a command is performed correctly, the treat dispenser may dispense an edible object.

18 Claims, 6 Drawing Sheets (56) References Cited

U.S. PATENT DOCUMENTS

| | | | |
|---|---|---|---|
| 2014/0251234 A1* | 9/2014 | Deutsch | A01K 15/021 |
| | | | 119/721 |
| 2014/0277701 A1* | 9/2014 | Martin | A01K 5/0114 |
| | | | 700/231 |
| 2015/0304540 A1* | 10/2015 | Breckman | A01K 5/02 |
| | | | 348/211.3 |
| 2016/0029590 A1* | 2/2016 | Martin | H04W 4/80 |
| | | | 221/1 |
| 2016/0029592 A1* | 2/2016 | Springer | A01K 5/0225 |
| | | | 119/51.11 |
| 2016/0086403 A1* | 3/2016 | Litterer | G07C 9/00111 |
| | | | 340/5.7 |
| 2016/0088818 A1* | 3/2016 | Thorne | A01K 27/009 |
| | | | 119/707 |
| 2017/0083018 A1* | 3/2017 | Womble | A01K 27/009 |
| 2017/0097738 A1* | 4/2017 | Athavale | G06F 3/0425 |
| 2017/0280674 A1* | 10/2017 | Davis | A01K 5/0114 |
| 2019/0357497 A1* | 11/2019 | Honchariw | A01K 15/021 |

* cited by examiner

METHODS AND DEVICE FOR PET ENRICHMENT

CROSS REFERENCE TO RELATED APPLICATIONS

This application claims the benefit of U.S. Provisional Patent Application Ser. No. 62/155,439, filed on Apr. 30, 2015, and incorporates the disclosure of the application in its entirety by reference. To the extent that the present disclosure conflicts with any referenced application, however, the present disclosure is to be given priority.

BACKGROUND

Embodiments disclosed in the present technology relate generally to pet training, and more specifically to an automatic pet training device and method of operating same.

Conventional pet training is performed in-person by the pet owner or professional pet trainer. Training can be done one-on-one with individual animals or with may be performed in a group setting. Pet training, especially for younger animals, requires many hours, spent daily, to train not only the pet's behavior, but also to train the pet to do tricks, such as sit, lay, turn around, etc. Proper training requires constant positive reinforcement, which is usually though the use of edible objects or treats. Training at this early stage can be quite time consuming for the owners, especially if the owner works outside the home. Pets that do not have constant reinforcement of what they are learning may not learn as quickly.

Additionally, some pets exhibit behavioral problems when left alone. Destructive or aggressive behavior may be the result of boredom and/or separation anxiety when the pet is left alone. Owners have limited choices to address these issues. One option is to take their pet to a boarding facility during the day. However, this option can be rather costly. Other options, such as asking friends or family to watch the animal all day, may not be feasible for every pet owner.

Accordingly, it would be desirable to have an affordable pet training device that reinforces a particular behavior, such as performing tricks, as well as provides the animal with an activity to reduce boredom and alleviate separation anxiety.

BRIEF DESCRIPTION OF THE DRAWINGS

For simplicity and clarity of illustration, elements in the figures are not necessarily drawn to scale, and the same reference numbers in different figures denote generally the same elements.

DETAILED DESCRIPTION OF THE DRAWINGS

The present technology may be described in terms of functional block components and various processing steps. Such functional blocks may be realized by any number of components configured to perform the specified functions and achieve the various results. For example, the present technology may employ various processors, controllers, timing devices, detection units, semiconductor devices, switching devices, and the like, which may carry out a variety of functions. In addition, the present technology may be practiced in conjunction with any animal training and/or activity system, and the device and method described are merely exemplary applications for the technology.

Methods and device for pet enrichment according to various aspects of the present technology may operate to in conjunction with a training tool, such as teaching the animal to perform particular commands, for example, sit, lay down, spin, etc. Methods and device for pet enrichment according to various aspects of the present technology may operate to in conjunction with a positive reinforcement system, for example, providing a reward, such as an edible object (treat). Methods and device for pet enrichment according to various aspects of the present technology may operate to in conjunction with an entertainment system, for example providing interactive activities such as fetching a particular object. Methods and device for pet enrichment according to various aspects of the present technology may provide positive reinforcement to the animal.

The device 100 may comprise various components configured to perform target recognition, analysis, and tracking. In various embodiments, the device 100 may detect the presence of an animal. For example, in one embodiment, the device 100 may detect that an animal is within a range of distance from the device 100. In various embodiments, the device 100 may detect and identify specific movements and/or activity of the animal. For example, the device 100 may detect and identify if the animal is spinning around or jumping. In various embodiments, the device 100 may detect the specific position of the animal, for example if the animal is sitting, standing, or laying down.

Figure 1:
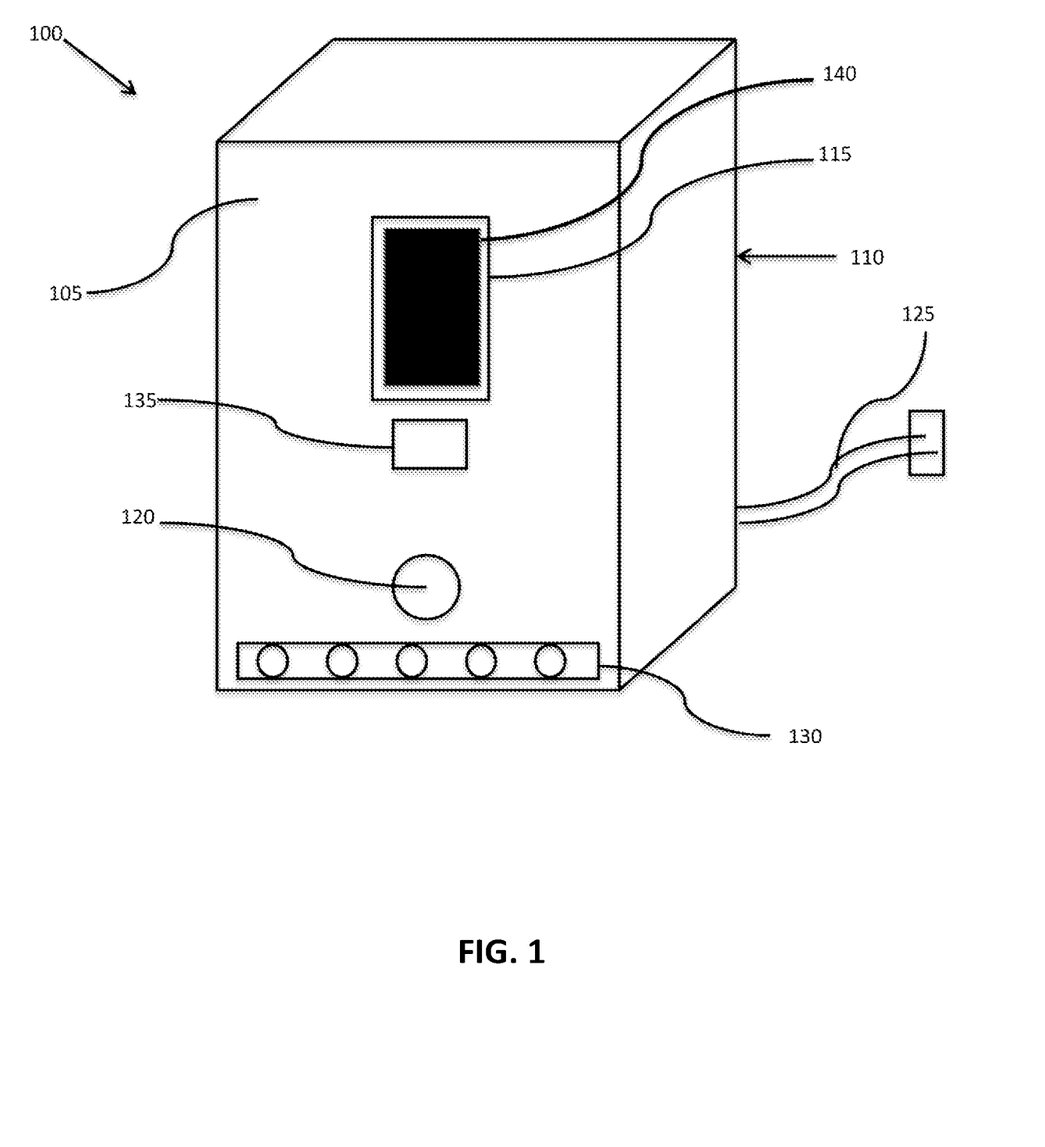
FIG. 1 representatively illustrates a pet enrichment device in accordance with an embodiment of the present technology.
Figure 2:
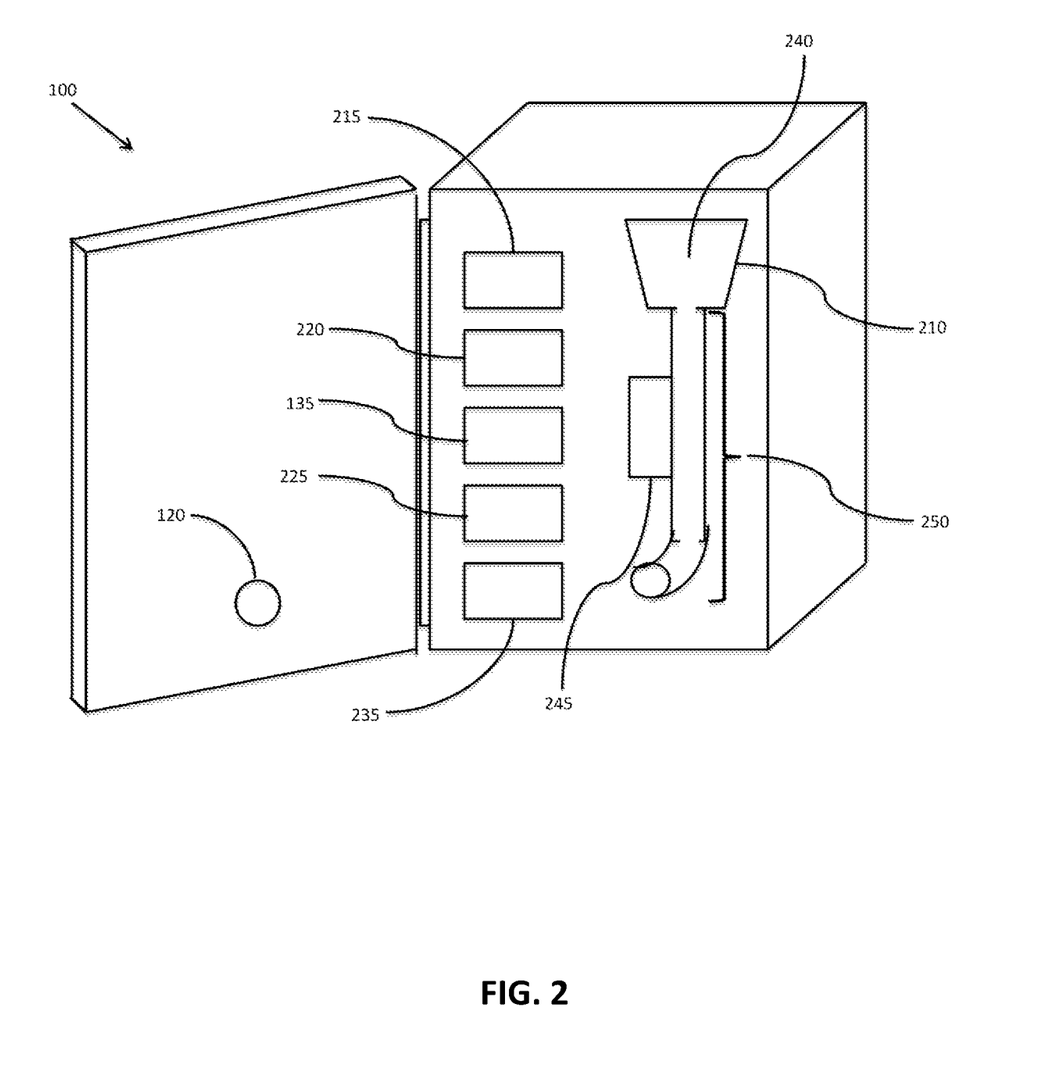
FIG. 2 representatively illustrates a pet enrichment device in accordance with an embodiment of the present technology.

Referring to FIG. 1, in various embodiments, methods and device 100 for pet enrichment may comprise a housing 105. In various embodiments, the housing 105 may comprise one or more surfaces forming an exterior portion 110, wherein at least one surface is movable, for example by a hinge, or removable by screws or any other suitable fastener. For example, the housing 105 may comprise eight (8) surfaces formed in the shape of a cube or rectangle. In various embodiments, the one of more surfaces may also form an interior portion 200 (FIG. 2). In various embodiments, the interior portion may be accessed by the movable surface.

In various embodiments the housing 105 may be constructed from a solid material, such as wood, plastic, metal, particle board, and/or any other type of durable materials. In various embodiments, the housing 105 may be constructed of two or more types of solid durable materials for added structural integrity. In various embodiments, the housing 105 may be constructed to stand upright while sitting on a floor, or may be affixed to a vertical surface, such as a wall, or door.

In various embodiments, the device 100 may comprise one or more openings 120 in the housing 105. In various embodiments, as least one opening 120 may provide an exit for edible objects. In various embodiments, the opening 120 is positioned near the bottom of the housing 105, but may be positioned in any suitable location.

In various embodiments, the device 100 may comprise a power supply. In one embodiment, the power supply may comprise an electrical connection 125 to an external power supply, such as a regular electrical outlet. In other embodiments, the power supply may comprise one or more batteries (not shown), for example, rechargeable lithium batteries.

The device 100 may comprise an interface device 115. In various embodiments, the interface device 115 may comprise a screen 140 for displaying video content, and a speaker (not shown) for projecting audio content. In various embodiments, the interface device 115 may comprise an electronic device, such as a tablet, iPad, or the like. In various embodiments, the interface device 115 may produce a cue, via the screen 140 and/or speaker, for the animal, where the cue provides the animal with a command. For example, the interface device 115 may display a video using hand gestures (i.e. sign language) to instruct, the animal to perform some command, such as come here, sit, lay down, spin, speak (bark), or any other command that a user wishes the animal to perform. The interface device 115 may also emit an audio cue, via the speaker, to instruct the animal to perform a command such as come here, sit, lay down, spin, speak (bark), or any other command that a user wishes the animal to perform. In various embodiments, the audio cue may comprise voice commands and/or "clicker" noises. In various embodiments, cues from both video and audio sources are produced simultaneously. In various embodiments, the interface device 115 comprises a camera (not shown) communicatively coupled to the screen 140 and/or speaker. In various embodiments, the interface device 115 comprises a communication unit (not shown), for example a wireless communication unit such as Bluetooth, to communicate with the device 100.

In an exemplary embodiment, the video and audio cues may be pre-recorded by an owner and/or a handler of the animal. For example, the owner may record him or herself giving a cue in the form of audio of visual cues. In one embodiment, the video and audio cues may be streamed to the interface device 115 via a network. In other embodiments, the video and audio cues may be saved directly to the interface device 115 and accessible by the device 100. In various embodiments, the cues are generated at predetermined times throughout the day, or may be generated at random times.

In various embodiments, the interface device 115 may provide positive reinforcement to the animal. For example, in various embodiments, the interface device 115 may project an image on the screen 140 in conjunction with an audio component, wherein the audio projects a complimentary message, such as "good dog."

In various embodiments, the device 100 may comprise a lighting source 130. In various embodiments, the lighting source 130 may be electrically connected to a relay mechanism (not shown) to provide dimming capability for the light source 130. In various embodiments, the light source 130 may be activated based on the external lighting conditions. For example, the light source 130 may be activated if the lighting levels are below a predetermined threshold value. In other embodiments, the light source 130 may be activated based on the activation of one or more other components of the device 100.

In an exemplary embodiment, the lighting source 130 may be affixed to the front of the housing body. The lighting source 130 may provide illumination to a predetermined area in front of the device 100. In one embodiment, the light source 130 may be affixed to the front lower half of the housing 105, however may be located in any suitable location to provide illumination to a desired area. The lighting source 130 may comprise an LED (light emitting diode) strip with multiple LEDs, or may comprise any other suitable light. The light source 130 may be selectively illuminated when the ambient light is below a predetermined level. The light source 130 may be activated at substantially the same time as various other components of the device 100. For example, the light source 130 may be activated at substantially the same time as the interface device 115 if the device 100 detects low lighting conditions of the ambient light.

In various embodiments, the device 100 may further comprise a clicker device to generate a "clicker" sound for providing various commands. In other embodiments, the interface device 115 may generate the "clicker" sound for the same or similar purpose.

In various embodiments, the device 100 may also be communicatively coupled to a network, for example the internet, so that the device 100 may be accessed remotely to provide cues to the animal. For example, the owner may be able to log into the device 100 remotely to activate the device 100 and provide any one of the pre-recorded cues to the animal and/or positive reinforcement.

In various embodiments, the device 100 may comprise an application and equipment for transmitting and receiving video. For example, the device 100 may operate in conjunction with Skype or a Skype-like application and a webcam.

Referring to FIG. 2, in various embodiments, the device 100 may comprise a treat dispenser 210 to provide positive reinforcement.

In various embodiments, the treat dispenser 210 may comprise a chamber 240, a channel 250, and a motorized mechanism 245. The treat dispenser 210 may be configured to hold multiple edible objects and may be configured to dispense one or more edible objects at a time. The treat dispenser 210 may be constructed of plastic, metal, glass, or any other suitable food-grade material.

Figure 6:
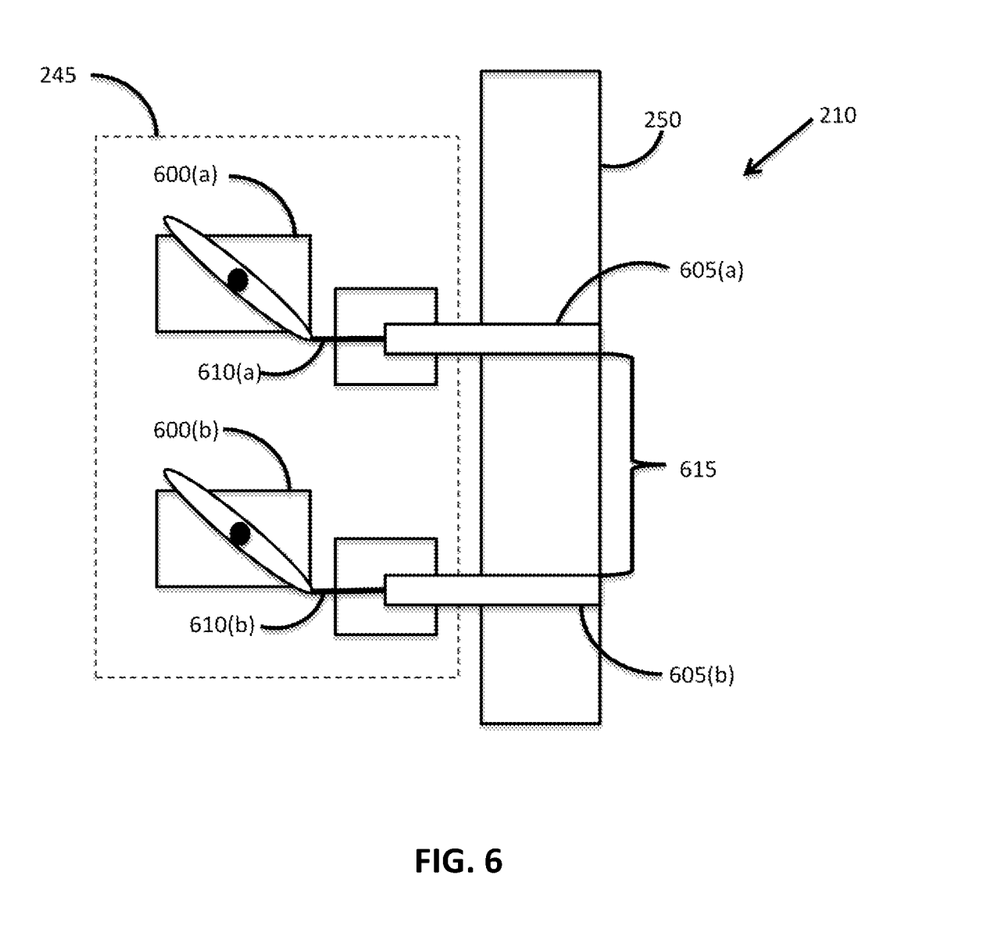
FIG. 6 representatively illustrates a cross section of a treat dispenser in accordance with an embodiment of the present technology.

Referring to FIG. 6, in an exemplary embodiment, the motorized mechanism 245 may comprise at least two (2) micro motors 600(*a*), 600(*b*), two (2) vertically slidable components 605(*a*), 605(*b*), two (2) fasteners 610(*a*), 610 (*b*), and two (2) springs (not shown). In one embodiment, each vertically slidable component 605(*a*), 605(*b*) is coupled to one of the micro motors 600 via one of the fasteners 610. In various embodiments, each spring may be movably coupled to an end of the vertically slidable components 605(*a*), 605(*b*) opposite that of the micro motors 600(*a*), 600(*b*) and fasteners 610(*a*), 610(*b*). The micro motors 600(*a*), 600(*b*) may be communicatively coupled to receive timing signals.

During operation, the micro motors 600(*a*), 600(*b*) may be timed such that a first slidable component 605(*a*) slides to the left (open), via a first micro motor 600(*a*) and a first fastener 610(*a*), to allow a treat to fall into an intermediate area 615, and then it slides back to the right (closed), via a first micro motor 600(*a*) and the first fastener 610(*a*) and/or in conjunction with a spring. Then, a second slidable component 605(*b*) slides to the left (open), via a second micro motor 600(*b*) and a second fastener 610(*b*), to allow a treat to fall out of the intermediate area 615, where the channel 250 directs the treat out of the opening 120 (FIG. 1). The second slidable component 605(*b*) then it slides back to the right (closed), via the second micro motor 600(*b*) and the second fastener 610(*b*) and/or in conjunction with a spring.

Referring back to FIG. 2, in various embodiments, the device 100 may further comprise a wireless communicator 220. In an exemplary embodiment, the device 100 may comprise one or more wireless communicators 220. The wireless communicator 220 may send and receive wireless signals. In one embodiment, the wireless communicator 220 communicates, via the wireless signals, with the interface device 115 (FIG. 1). The wireless communicator 220 may also communicate, via wireless signals, with a remote device. For example, the wireless signals may be the form of infrared light or radio waves. In various embodiments, the remote device may comprise a cellphone configured to send radio waves, or any other device configured to communicate via wireless signal.

In various embodiments, the device 100 may further comprise a microcontroller 215. The microcontroller 215 may comprise a single integrated circuit containing a processor core, memory, and programmable input/output peripherals. In other embodiments, the processor and memory may be formed on separate chips. The microcontroller 215 may be programmed to initialize the interface device 115 (FIG. 1), store data received from the data acquisition unit 135, and operate the treat dispenser 210. The microcontroller 215 may comprise various hardware devices, semiconductor components, and/or wiring schemes to perform logic operations suitable to a particular embodiment. In various embodiments, the microcontroller 215 may be electrically connected to the light source 130 and may control illumination of the light source 130. In one embodiment, the microcontroller 215 may be programmed to initialize the interface device 115 via a wireless communicator 220. In other embodiments, the microcontroller 215 may initialize the data acquisition unit 135, and the treat dispenser 210, via an electrical connection. In various embodiments, the microcontroller 215 may be electrically connected to the power distribution device 220.

The microcontroller 215 may comprise a central processing unit and memory. The microcontroller 215 may receive and process communication signals from other components of the device 100. The microcontroller 215 may be formed on a single integrated circuit and may comprise a central processing unit, local memory, and programmable input/output peripherals. For example, the microcontroller 215 may provide ROM, EPROM, EEPROM, or flash memory. The microcontroller 215 may be configured to send and receive data from other components of the device 100 via input/output peripherals. The input/output peripherals may provide an electrical connection providing power and data to the components connected to the microcontroller 215. For example, the microcontroller 215 may be programmed using any suitable programming language, for example, C, C++, Java, Python, PHP, JavaScript, Ruby, and SQL. In some embodiments, the microcontroller 215 may be individually addressable. In some embodiments, the microcontroller 215 may be equipped with a UART or a USART to transmit and receive communication to and from a peripheral device port.

In various embodiments, the device 100 may further comprise a microphone 235. The microphone 235 may be configured to detect a sound above a certain frequency or decibel level. For example, in one embodiment, the microphone 235 is configured to detect the bark of an animal. The microphone 235 may be positioned in any location within the device 100. The microphone 235 may be coupled to the microcontroller 215.

Figure 4A:
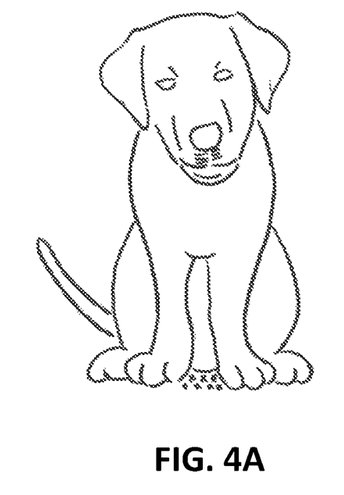
FIGS. 4A-4C representatively illustrate various detectable positions and movements in accordance with an embodiment of the present technology.
Figure 4B:
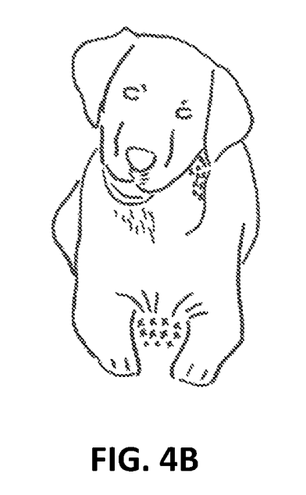
Figure 4C:
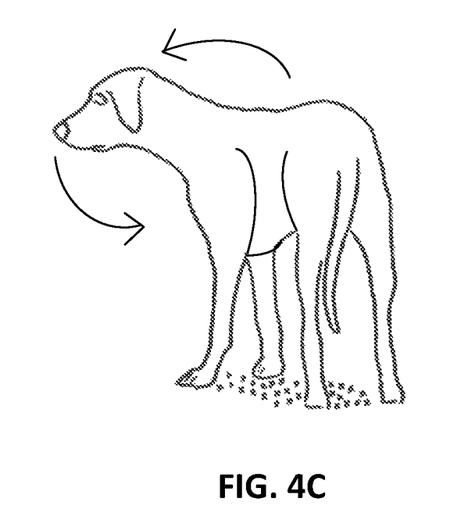

In various embodiments, the device 100 may comprise a data acquisition unit 135. In various embodiments, the data acquisition unit 135 may comprise any number of components to recognize, analyze, and track the animal to determine the specific position and/or movements of the animal, for example, a sit position, as illustrated in FIG. 4A, a laying position, as illustrated in FIG. 4B, and a spinning motion, as illustrated in FIG. 4C. For example, the data acquisition unit 135 may comprise one integrated device to perform recognition, analysis, and tracking, while in other embodiments, the data acquisition unit may comprise multiple devices to perform recognition, analysis, and tracking, each device communicatively coupled and performing separate functions. The data acquisition unit 135 may be partially or substantially integrated in the housing 105.

In various embodiments, the data acquisition unit 135 may comprise various 3D mapping technology and methods, for example, the 3D mapping methods as described in U.S. Application No. 2010/0199228, U.S. Application No. 2010/0201811, U.S. Application No. 2010/0195867, U.S. Application No. 2010/0118123, U.S. Application No. 2013/0038941, which are incorporated by reference herein.

In various embodiments, the data acquisition unit 135 may comprise a lens or lenses, and may be integrated in the housing 105 such that the lens or lenses protrude through the front of the housing 105 while a substantial portion of the data acquisition unit 135 may be located within the interior of the device 100.

In one embodiment, the data acquisition unit 135 may comprise a color-detecting camera. For example, the camera may be programmed to detect predefined colors. These predefined colors may be worn by the animal and configured for optimum detection. For example, the animal may wear a harness 25 having a color blocking configuration with multiple colors. Other wearable color blocks may be implemented, such as colored booties, color blocked vests, color blocked shirts, or color blocked collars. In various embodiments, the camera may determine x-y-z coordinates of each of the color blocks. The x-y-z coordinates may be tracked and stored over a period of time, for example 10 seconds. The microcontroller 215 may analyze the x-y-z coordinates to determine the specific position of the animal based on the x-y-z coordinates of the color blocks, and may determine the specific movements of the animal based on the x-y-z coordinates of the color blocks over the specified period of time.

Figure 5A:
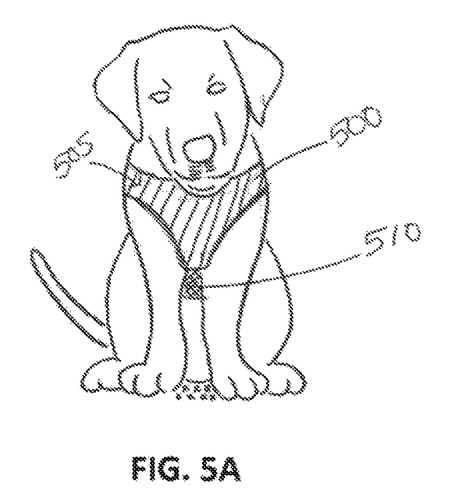
FIGS. 5A-5B representatively illustrate an animal with wearable color blocking in accordance with an embodiment of the present technology.
Figure 5B:
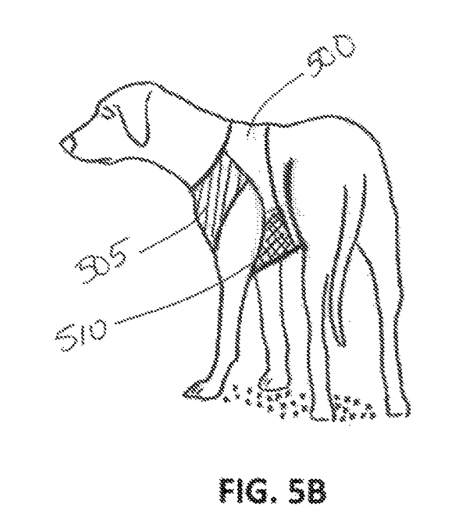

Referring to FIGS. 5A-5B illustrates an animal with wearable color blocking in accordance with one embodiment. The figures illustrate the use of color blocking on a harness 500. As illustrated, the harness 500 may have two blocks of color. The harness 500 may comprise a pink color block 505, and a green color block 510. In one embodiment, where a color-detection camera is used for the data acquisition unit 135, the color-detection camera may be programmed to detect only the pink and green colors of the harness 500. Other configurations using color blocks, such as orange, blue, purple, or any other color may be implemented, and configurations using more than two colors may also be implemented.

The data acquisition unit 135 may comprise a depth sensor, for example a depth camera, using an infrared (IR) projector and a monochrome CMOS (complementary metal oxide semiconductor) sensor. For example, the infrared projector may project a pattern of infrared light and the distortion, which is caused when the pattern becomes distorted by light, is read by the depth camera. The depth camera may then analyze the IR patterns to build a 3-D map of the room and all objects within it.

The device 100 may comprise a computing environment. The computing environment may comprise hardware components and/or software components such that the computing environment may be used to execute applications, such the interface device 115. The computing environment may comprise a central processing unit (CPU) having a level 1 cache, a level 2 cache, and a flash ROM (Read Only Memory). The level 1 cache and a level 2 cache temporarily store data and hence reduce the number of memory access cycles, thereby improving processing speed and throughput. The CPU may be provided having more than one core, and thus, additional level 1 and level 2 caches. The flash ROM may store executable code that is loaded during an initial phase of a boot process when the multimedia console is powered ON.

The data acquisition unit 135 may comprise may a camera that may be used to visually monitor the target, such as the animal, such that specific positions and/or movements performed by the animal may be captured, analyzed, and tracked to activate the treat dispenser 210.

The animal may have to retrieve an object ejected from the device 100. In such embodiments, the animal may be holding the object such that the motions of the animal and the object may be used to adjust and/or control parameters the interface device 115. For example, the animal may be holding a ball in his or her mouth and the interface device 115 may instruct the animal to "drop" the ball.

According to an exemplary embodiment, the data acquisition unit 135 may be configured to capture video with depth information including a depth image that may include depth values via any suitable technique including, for example, time-of-flight, structured stereo image, or the like. According to one embodiment, the data acquisition unit 135 may organize the calculated depth information into "Z layers," or layers that may be perpendicular to a Z axis extending from the depth sensor along its line of sight.

The data acquisition unit 135 may comprise an image camera component. According to an example embodiment, the image camera component may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

According to an example embodiment, the image camera component may comprise an IR light component, a three-dimensional (3-D) camera, and an RGB camera that may be used to capture the depth image of a scene. For example, in time-of-flight analysis, the IR light component of the data acquisition unit 135 may emit an infrared light onto the scene and may then use sensors (not shown) to detect the backscattered light from the surface of one or more targets and objects in the scene using, for example, the 3-D camera and/or the RGB camera. In some embodiments, pulsed infrared light may be used such that the time between an outgoing light pulse and a corresponding incoming light pulse may be measured and used to determine a physical distance from the data acquisition unit 135 to a particular location on the targets or objects in the scene. Additionally, in other example embodiments, the phase of the outgoing light wave may be compared to the phase of the incoming light wave to determine a phase shift. The phase shift may then be used to determine a physical distance from the data acquisition unit 135 to a particular location on the targets or objects.

According to another example embodiment, time-of-flight analysis may be used to indirectly determine a physical distance from the data acquisition unit 135 to a particular location on the targets or objects by analyzing the intensity of the reflected beam of light over time via various techniques including, for example, shuttered light pulse imaging.

In another ample embodiment, the data acquisition unit 135 may use a structured light to capture depth information in such an analysis, patterned light (i.e., light displayed as a known pattern such as grid pattern or a stripe pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera and may then be analyzed to determine a physical distance from the data acquisition unit 135 to a particular location on the targets or objects.

According to another embodiment, the data acquisition unit 135 may comprise two or more physically separated cameras that may view a scene from different angles, to obtain visual stereo data that may be resolved to generate depth information.

The data acquisition unit 135 may further comprise a processor that may be in communication with the image camera component. The processor may comprise a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The device 100 may further comprise a memory component that may store the instructions that may be executed by the processor, images or frames of images captured by the 3-D camera or RGB camera, or any other suitable information, images, or the like. According to an example embodiment, the memory component may include random access memory (RAM), read only memory (ROM), cache, Flash memory, a hard disk, or any other suitable storage component. In one embodiment, the memory component may be a separate component in communication with the image capture component and the processor. According to another embodiment, the memory component may be integrated into the processor and/or the image capture component.

Additionally, the data acquisition unit 135 may provide the depth information and images captured by, for example, the 3-D camera and/or the RGB camera, and a skeletal model of the animal that may be generated by the data acquisition unit 135 to the computing environment via the communication link. The computing environment may then use the skeletal model, depth information, and captured images to recognize the animal's position and movement (i.e. gestures) in response to cues generated by the interface device 115. For example, the computing environment may include a gestures recognizer engine. The gestures recognizer engine may include a collection of gesture filters, each comprising information concerning a gesture that may be performed by the skeletal model (as the animal moves). The data captured by the cameras and device in the form of the skeletal model and movements associated with it may be compared to the gesture filters in the gesture recognizer engine to identify when the animal (as represented by the skeletal) model) has performed one or more gestures. Those gestures may be associated with various controls of an application. Thus, the computing environment may use the gesture recognizer engine to interpret movements of the skeletal model and to control an application based on the movements.

A graphics processing unit (GPU) and a video encoder/video codec (coder/decoder) may form a video processing pipeline for high speed and high resolution graphics processing. Data is carried from the graphics processing unit to the video encoder/video codec via a bus. The video processing pipeline may output data to an A/V (audio/video) port for transmission to the interface device 115 or other display. A memory controller may be connected to the GPU to facilitate processor access to various types of memory, such as, but not limited to, a RAM (Random Access Memory).

In an alternative embodiment, the data acquisition unit 135 may comprise a pressure sensor, for example a pressure sensitive pad. In various embodiments, the pressure sensitive pad may comprise sensors to detect pressure, such as capacitive sensing and weight sensing. In various embodiments, the pressure sensitive pad may be coupled to the microcontroller 215. The pressure sensitive pad may transmit signals generated by the sensors to the microcontroller 215 and/or computing environment, wherein the location of the generated signals may be analyzed to determine the specific position and/or specific movement of the animal.

In another embodiment, the data acquisition unit 135 may comprise wireless transmission of motion utilizing one or more sensors, such as a gyroscope, a compass, an accelerometer, a radio-frequency identification ("RFID) chip, barometric pressures, and the like. The detection unit may comprise a wearable companion device, such as a collar or harness, configured to transmit signals from the sensor to the microcontroller 215 and/or computing environment, wherein signals may be analyzed to determine the specific position and/or specific movement of the animal. The wearable device may comprise a power source, such as a battery. Wearable devices may also provide a mechanism for distinguishing between multiple animals.

The device 100 may further comprise a power distribution device 225 to distribute power to various components, such as the microcontroller 215, the interface device 115 (FIG. 1), the data acquisition unit 135, and the like. The power distribution device 225 may comprise multiple outlets, such as USB outlets, and any other outlets for providing an electrical connection.

Figure 3:
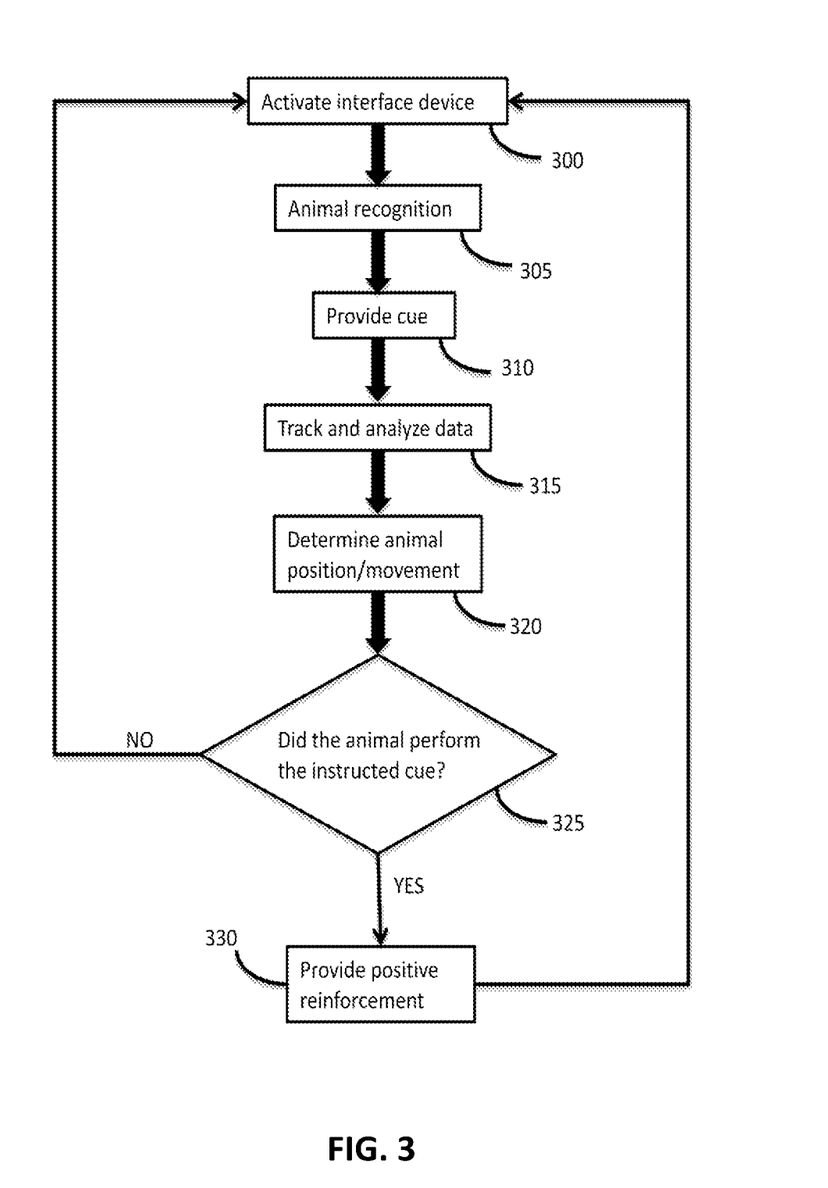
FIG. 3 illustrates a flowchart in accordance with an embodiment of the present technology.

Referring to FIG. 3, in operation, the device 100 may activate 300 via the microcontroller 215 or other processor. Activation 300 may comprise initializing the interface device 115, wherein activation 300 may be performed at set times or activation 300 may be performed at random times. In various embodiments, the data acquisition unit 135 may then perform recognition 305 to determine whether or not the animal is present. If the data acquisition unit 135 determines that the animal is present 305, then the interface device 115 may provide a cue 310, such as displaying a video and/or audio cue, to instruct the animal to perform some command, such as sit or lay down. After the cue is presented to the animal, the device 100 may then analyze data from the data acquisition unit 135 and track 315 the animal to determine the specific position and/or movements of the animal. If the animal performs the instructed cue 325, the animal may receive some form of positive reinforcement 330, such as a treat via the treat dispenser 310 or complimentary message via the interface device 115 and/or speaker. If the animal does not perform the instructed cue 325, then the device 100 may begin a new activation 300 as described above.

In various embodiments, the device 100 (FIG. 1) may record and log the animal's performance. For example, the device 100 may record the number of times a cue as provided and the number of times the animal successfully performed the given cue. In various embodiments, the device 100 may also record and track the performance of particular cues for progressive training purposes. For example, the animal may be given one or two basic cues when the animal is first introduced to the device 100 and then increase the level of difficulty as the animal shows increased performance. The owner may then be able to access the logged data, by downloading the data or any other suitable method to view the animal's progress. In various embodiments, the animal may be recorded via a camera operable as a video camera for recording the animal as it performs the cues. For example the recorded video may be viewed at a later time by the owner or to update and modify the device 100.

In various embodiments, operation of the device 100 may be controlled remotely by the owner. The owner may select and provide a specific cue, for example one of the pre-recorded cues, via the interface device 115, to the animal. The owner may receive a live streaming video of the animal while it performs the cue to access the animal's performance. In various embodiments, the owner may be able to provide positive reinforcement remotely. Positive reinforcement may be provided if the animal performs the given cue correctly, or for no reason at all.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of the present technology. Furthermore, while some embodiments described herein include some but not other features included in other embodiments, combinations of features of different embodiments are meant to be within the scope of the present technology, and form different embodiments, as would be understood by those skilled in the art.

The invention claimed is:

1. A training device for a target, comprising:
   an interface device comprising a display screen, wherein the interface device generates a first cue;
   a data acquisition unit, wherein the data acquisition unit generates recognition data of a colored article capable of being worn by the target;
   a processor communicatively coupled to the data acquisition unit, wherein the processor receives and analyzes data from the data acquisition unit to determine a body posture of the target based on a color of the article;
   a treat dispenser communicatively coupled to the processor, wherein the treat dispenser receives a control signal from the processor.

2. The device of claim 1, wherein the data acquisition unit comprises a camera to detect one or more predetermined colors.

3. The device of claim 1, wherein the data acquisition unit comprises a pressure sensor.

4. The device of claim 1, wherein the data acquisition unit comprises a depth sensor.

5. The device of claim 1, wherein the data acquisition unit comprises an infrared projector.

6. The device of claim 1, further comprising a memory.

7. The device of claim 1, further comprising a wireless communicator.

8. The device of claim 1, further comprising an infrared projector to project a pattern of infrared light.

9. The device of claim 1, further comprising a speaker for generating a second cue.

10. The device of claim 1, further comprising a microphone to detect noise.

11. The device of claim 1, wherein the first cue comprises at least one of a come here, sit, lay, and spin; and a second cue comprises a speak command.

12. A pet training and activity system comprising:
    a processor;
    an interface device, communicatively coupled to the processor, comprising a display screen, wherein the interface device generates a first cue;
    a data acquisition unit, communicatively coupled to the processor, comprising a depth sensor and an infrared projector, wherein the data acquisition unit generates recognition data of a colored article capable of being worn by a target;
    wherein the processor receives and analyzes data from the data acquisition unit to determine at least one of a body posture and a movement of the target based on tracking a color of the article in space and time and whether at least one of the determined body posture and the determined movement corresponds to the first cue; and
    a treat dispenser communicatively coupled to the processor, wherein the treat dispenser receives a control signal from the processor to indicate that at least one of the determined body posture and the determined movement corresponds to the first cue.

13. The system of claim 12, wherein the depth sensor comprises a camera.

14. The system of claim 12, further comprising a light source.

15. The system of claim 12, further comprising a memory.

16. The system of claim 12, further comprising a wireless communicator.

17. The system of claim 12, wherein the infrared projector projects a pattern of structured light.

18. The system of claim 12, further comprising a speaker for generating a second cue.

* * * * *